Oct. 30, 1934.  C. J. HALBORG  1,978,458
BROACHING FIXTURE
Filed Feb. 25, 1931  2 Sheets-Sheet 1
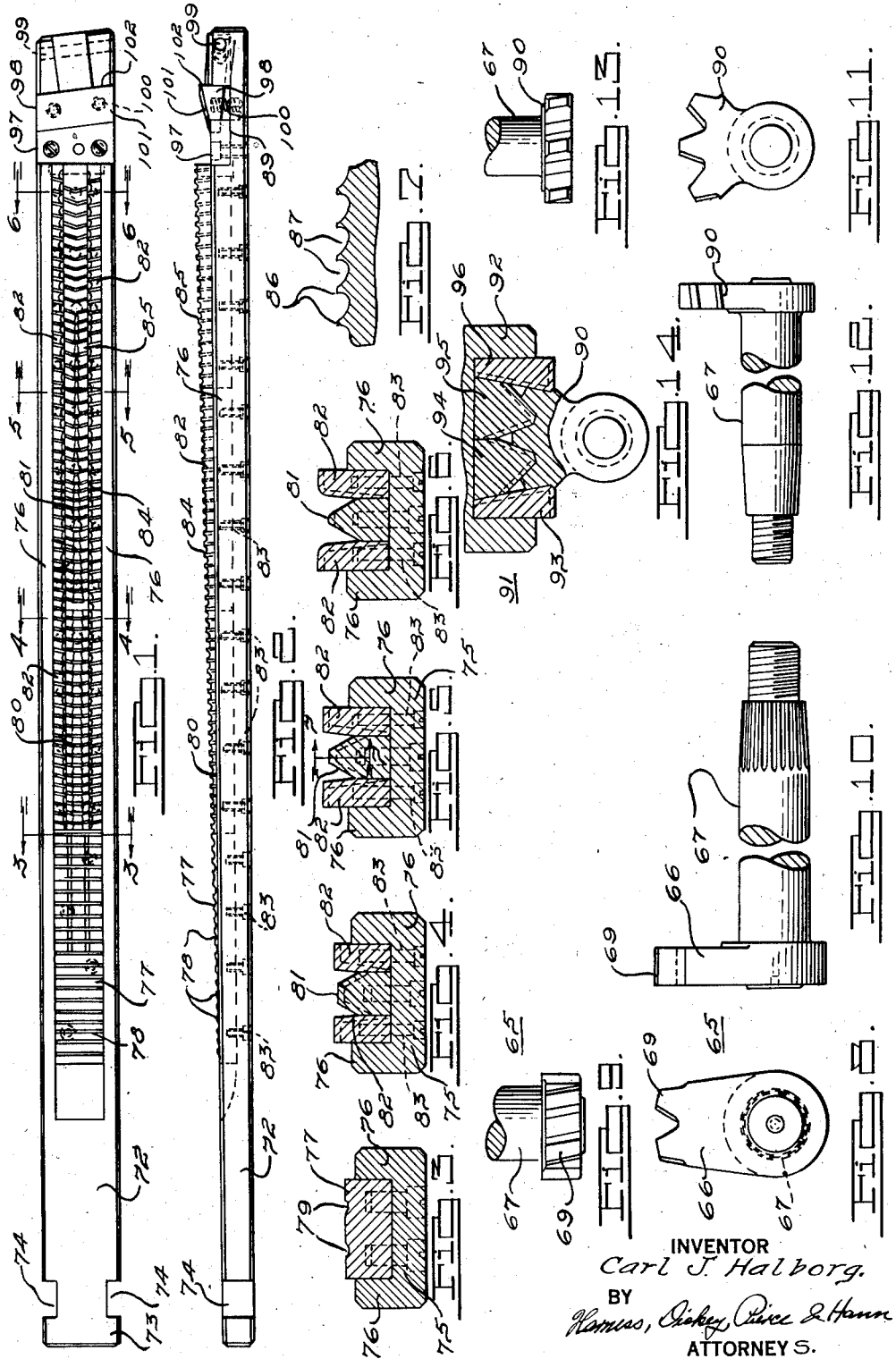
INVENTOR
Carl J. Halborg.
BY
ATTORNEYS.

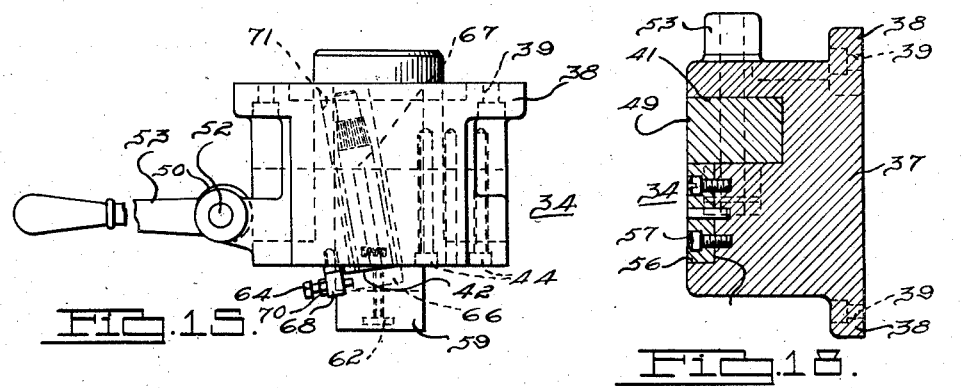
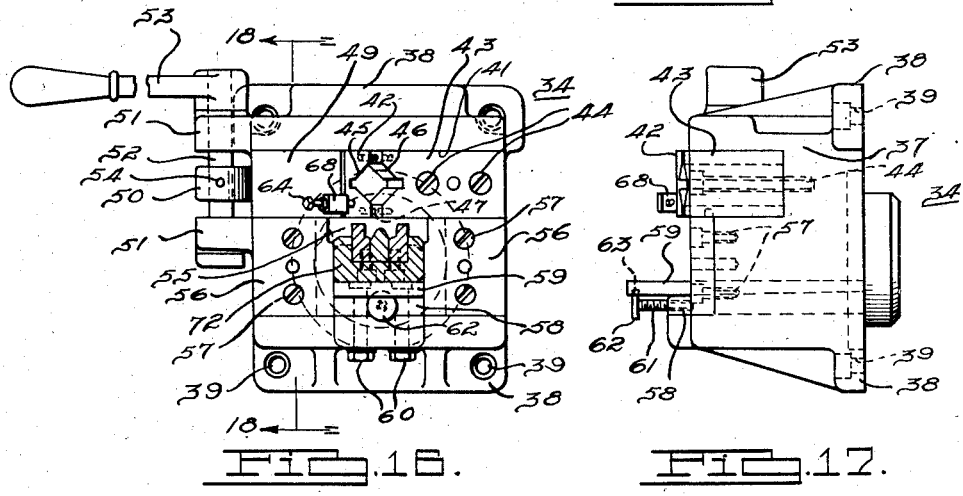
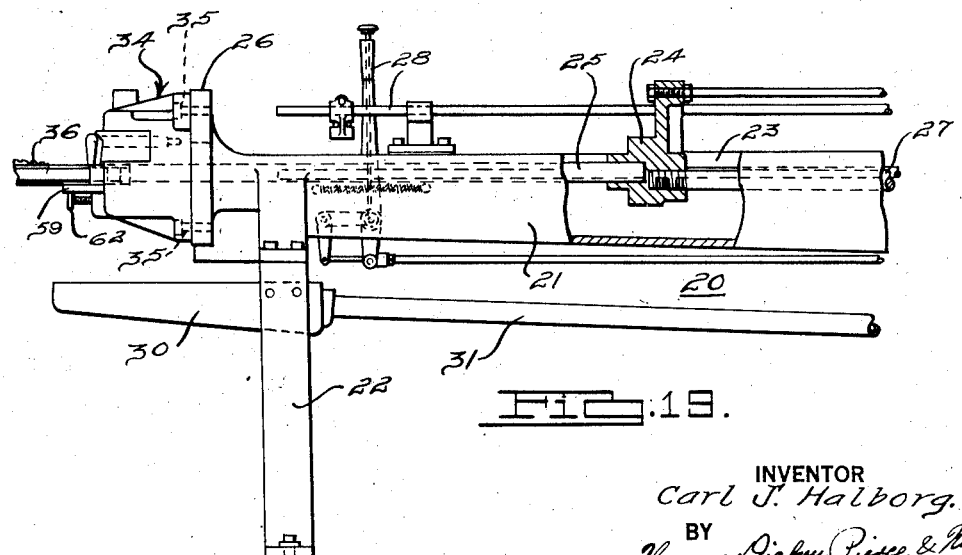

Patented Oct. 30, 1934

1,978,458

UNITED STATES PATENT OFFICE 1,978,458

BROACHING FIXTURE

Carl J. Halborg, Detroit, Mich., assignor to Colonial Broach Company, a corporation of Michigan Application February 25, 1931, Serial No. 518,063

1 Claim. (Cl. 90—33)

My invention relates to broaches and broaching fixtures, and particularly to a broach and fixture for cutting gear teeth and the like.

The machining of spur gears is usually accomplished by mounting a plurality of the gear blanks together and cutting the teeth in the periphery thereof simultaneously by a milling or like operation. Such mass production entails considerable expense in time, labor and equipment and when the teeth of the gears are disposed diagonally to its sides further time and expense is entailed in the machining operation as each gear must be machined individually.

A helical gear is an example of one having teeth diagonal to its sides and when such a gear or segment is to be machined, the blank or segment must be mounted individually on an integrating head which rotates the gear or segment in relation to the teeth of the cutter which are moved laterally thereacross. It is very apparent that a gear or segment of this type is considerably more expensive to machine, requiring additional apparatus, time and labor, in comparison with the massed machining of the spur type of gear.

In practicing my invention, I am able to considerably reduce the time, labor and expense required to machine a helical gear segment, by providing a machine in which the segment is supported and the teeth cut therein by a single operation of a cutter. I employ a machine having a reciprocable operating mechanism, which draws the cutters directly across the periphery of the segment to be machined and by having the segment disposed at an angle to the cutter the teeth are cut diagonally to the sides and the segment is provided with the helical type of teeth.

I prefer to employ a built-up broaching cutter, having a body portion in which a plurality of elements are disposed and retained in predetermined fixed position, having cutting edges of such shape and conforming with each other in such manner, as to provide a cutting contour which produces teeth-like projections on the periphery of the segment.

Accordingly, one object of my invention is to provide a machine, having a reciprocable broaching cutter which is drawn once across the periphery of a segment to machine teeth therein.

Another object of my invention is to provide a holder for a segment, in the periphery of which teeth are to be cut in the above described manner, having means for retaining the segment at an angle to the cutter which thereby machines teeth which are angularly disposed to the sides of the segment, which are of the helical type.

A further object of my invention is to provide a broaching cutter, for machining teeth in the periphery of an element, that is built up from a plurality of members having cutting edges, which conform with each other to effect a teeth cutting contour.

A still further object of my invention is to provide a machine for cutting teeth in a gear, which is simple in construction, economical of manufacture, and which is capable of cutting teeth of either the spur or helical type in a single operation.

Numerous other objects and features of novelty of my invention will be either specifically pointed out or will become apparent when referring, for a better understanding of my invention, to the following description in conjunction with the accompanying drawings wherein:

Figure 1 is a plan view of a broaching cutter embodying features of my invention, Fig. 2 is a side view, in elevation, of the cutter shown in Fig. 1, Figs. 3, 4, 5 and 6 are enlarged, successive, transverse sectional views of the structure shown in Fig. 2, taken respectively on the line 3—3, 4—4, 5—5 and 6—6 thereof.

Fig. 7 is a fragmentary sectional view of the structure shown in Fig. 5, taken along the line 7—7 thereof, Fig. 8 is an end view, in elevation, of a gear segment as machined by my cutters, Fig. 9 is a broken plan view of the structure shown in Fig. 8, Fig. 10 is a broken side view, in elevation, of the structure shown in Fig. 8, Figs. 11, 12 and 13 are, respectively, end, side and plan views of a gear segment, similar to the gear segment shown in Figs. 8, 9 and 10, with the exception that three teeth are cut thereon by a broaching cutter embodying a modified form of my invention, Fig. 14 is a view, partly in section and partly in elevation, of a gear segment shown in Figs. 11, 12 and 13 and of a broaching cutter embodying a modified form of my invention, Figs. 15, 16 and 17 are respectively plan, face and side views of a broaching fixture embodying features of my invention, Fig. 18 is a sectional view of the structure shown in Fig. 16, taken along the line 18—18 thereof, and Fig. 19 is a broken sectional view, in elevation, of a broaching machine embodying features of my invention.

Referring more particularly to Fig. 19, my invention comprises in general a machine 20 provided with a cradle 21, the front end of which is supported on the standard 22, the rear end of which is supported on a base portion (not shown). The cradle 21 is provided with side rails 23 upon which a head 24 is mounted for reciprocable movement and from the front of which a pull bar 25 extends through a face plate 26.

A suitable reciprocable operating mechanism (not shown) is connected to the head 24 through a rod 27 by which the reciprocable motion is transferred to the head 24 and pull bar 25. Suitable controlling means 28 is provided, associated with the cradle, for the purpose of effecting the reciprocation of the head 24 when the operating mechanism is regulated thereby. A suitable liquid and chip receiving pan 30 is supported on the standard 22, and is provided with a drain conduit 31, from which the liquid is screened and drained into a reservoir (not shown).

A suitable work retaining and cutter guiding chuck 34 is supported on the face plate 26, by bolts 35, through which the pull bar 25 extends for receiving a cutter 36 for the purpose of drawing it through the chuck 34.

Referring more particularly to Figs. 15, 16, 17 and 18, I have shown the chuck 34 as comprising a body portion 37 having flanges 38 in which the bolt-receiving holes 39 are provided for the purpose of mounting the chuck on the face plate 26 as above described. A laterally disposed channel 41 is provided in the body portion in which jaws 42 and 43 are retained, the latter by means of bolts 44. The engaging ends of the jaws are provided with sloping faces 45 and 46 respectively and are biased from each other by springs 47 which are disposed between the jaws. An operating block 49 is mounted in the channel 41 adjacent to the jaw 42, which is actuated by a cam 50, for movement longitudinally within the channel.

Lugs 51 are provided on the side of the body portion 37, through which a shaft 52 extends and which may be rotated therein by an operating handle 53 provided on its upper end. The cam 50 is retained in fixed position on the shaft 51 by a pin 54 and when the handle 53 is revolved the cam 50 is rotated to move the operating block 49 inwardly to force the jaws into firm relation with a member. When the handle 53 is moved in an opposite direction, the cam releases the block 49 and the springs 47 move one portion of the jaws and therefore the operating block 49, outwardly in the slot 41 for the purpose of releasing the clamped member.

An aperture 55 is provided through the center of the body portion, longitudinally thereof having guide plates 56 mounted adjacent thereto on the front of the body portion 37 by bolts 57, for preventing the lateral movement of the broaching cutter 36, relative to the chuck.

A suitable plate 59 is provided in the aperture 55, across the upper surface of which the broaching cutter 36 is drawn by the pull bar 25. The lower surface of the plate 59 is sloping, as shown in Fig. 17, which registers with the oppositely sloping surface on a plate 58, disposed therebelow. The plates 58 and 59 are clamped together in fixed position by bolts 60 after the plate 59 has been adjusted laterally relative to the plate 58.

To effect the adjustment of the plates 58 and 59 relative to each other, I have provided an adjusting screw 61 which engages threads in the front surface of the plate 58 and which is provided with an enlarged, cylindrical shaped head 62, the upper portion of which registers with a slot 63, provided in the under side of the plate 59. When the head 62 is rotated to have the screw 61 drawn inwardly into the plate 58, the plate 59 is moved therewith, through the engagement of the head 62 with the slot 63 in the plate. The inward movement of the plate 59, relative to the plate 58, effects a fine vertical adjustment for raising or lowering the broaching cutter relative to the work piece.

The work piece 65 is more clearly shown in Figs. 8, 9 and 10 as being a segment of a gear 66 provided integral with a spindle 67, the segment and spindle being a portion of the steering mechanism of an automobile. It is to be understood that my machine is not limited to cutting helical teeth or to machining this particular type of work piece as it is very apparent to anyone skilled in the art that, by changing the chuck 35, other types of gear segment may be supported to have teeth cut normal or at any angle, to the sides of any gear segment.

As shown in the figures, teeth 69 are provided diagonally to the sides of the segment and are therefore of the helical type which, as pointed out hereinabove, is considerably expensive to provide because each gear or segment must be machined individually. Referring again to Figs. 15 and 16, it will be noted that the faces 45 and 46 on the jaws 42 and 43 are disposed at right angle to the front surfaces thereof which are in angularly disposed relation to the body portion 37 of the chuck. An aperture 71 is provided in the body portion 37, as shown in Fig. 15, in angular relation to its front surface for the purpose of receiving the spindle 67 when the front portion thereof is clamped between the jaws.

A suitable engaging screw 64 is mounted on the side of the operating block 49, by means of the threaded boss 68, having a clamping nut 70 for the purpose of retaining the screw 64 in fixed relation therewith. The purpose of the adjusting screw 64 is to position the segment 66 laterally with respect to the broaching cutter 36.

The operation of my machine will now be described. Referring more particularly to Figs. 15 to 19 inclusive, the handle 53 is first moved in a counter-clockwise direction to release the operating block 49 and to permit the jaws to separate under the bias of the springs 47. The spindle 67 of a work piece, is then inserted through the jaws until the rear surface of the segment 66 engages the front surface of the jaws. The segment is drawn over and retained against the adjusting screw 64 and the handle 53 is then revolved in a clockwise direction to have the cam 50 thereon force the operating block 49 laterally against the jaws, to cause them to close in upon the work piece. During this movement the segment 66 is adjusted relative to the cutter, by the adjusting screw 64 and the spindle 67 is firmly clamped between the surfaces 45 and 46 of the jaws.

The broaching cutter 36 is then drawn rearwardly of the machine through the actuation of the operating mechanism, when energized through the movement of the handle 28, in a well known manner and, after the broach has moved to its rearward position, the teeth have been cut in the segment in a manner well known in the art. After the first segment is machined, the teeth are then gaged and if too shallow or deep, the adjustment of the plates 58 and 59, relative to each other, are made in the above mentioned manner and thereafter teeth of the proper height will be cut in the periphery of the segments by the subsequent machine operations. The machine is then reciprocated to have the broaching cutter extend frontwardly of the chuck as shown in Fig. 19, and a new gear segment is then inserted in the chuck and the operation repeated.

Referring more particularly to Figs. 1 to 7 inclusive, the broaching cutter 36 employed with my machine will now be described in detail. A body portion 72 is provided with a pull-rod engaging end 73 having recesses 74 by means of which the broach is engaged and drawn by the pull bar through the clamping fixture or chuck 34. The center of the body portion is cut away to provide a channel-like structure, as shown in Figs. 3 to 6 inclusive, having a bottom web 75 and two upstanding flanges 76 of considerable thickness to provide strength to the body portion.

Cutting bars are mounted in the channel, thus formed, and, as shown in Fig. 3, the frontmost bar 77 is of the same width as that of the channel and is provided with teeth 78 which extend slightly above the flanges 76. It will be noted that the first few rows of teeth 78 are solid transversely of the bar which machines the peripheral surface of the gear segment 66 to form the top surface of the gear teeth. The rearmost teeth 78 are provided with aligned indentations of increasing depth 79, as shown in Fig. 3, which conform to the upper end of the teeth on the segment, the periphery of the segment adjacent to the teeth is cut away by the upstanding portions between and on either side of the indentations.

Adjacent to the rearward end of the bar 77, a second section 80 comprising three cutting bars as shown in Fig. 4 is provided of a length substantially the same as that of the cutting bar 77. The section 80 comprises a central bar 81 and two co-operating side bars 82 which are retained in the channel of the body portion 72 by bolts 83 and project from above the flanges 76 a greater distance than the teeth 78 of the bar 77. The teeth are provided on the individual bars in progressing heights and widths, in such manner as to constitute with the teeth of the adjacent bar, indentations of a contour exactly opposite to that of the teeth to be cut in the segment 66.

Adjacent to the section 80, a third section 84 is provided which is shown in section in Fig. 5, as comprising three bars similar to the aforesaid bars shown in Fig. 4 but of greater height to provide a greater depth therebetween and which conform to the contour of the teeth to be cut. Adjacent to the rear end of the section 84 a fourth section 85 is provided which is similar to the sections 82 and 83 with the exception that the indentations between the bars thereof more clearly resemble the teeth to be cut so that the indentations at the end of the section are provided with a contour which is exactly opposite to that of the teeth to be machined in the segment 66.

It is to be understood that the indentations 79 in the section 77 and those provided between the various bars in the sections 82, 83 and 84, progressively increase in width and depth from the front to the rear end of the bar in substantially equal steps to provide a broaching cutter which machines away the periphery of the sector 66 in substantially equal amounts throughout the length of the cutter.

In Fig. 7, I have shown a longitudinal sectional view of the central bar of section 84 which is provided with cutting edges 86 between which recesses 87 are provided wherein the chips are received as they are cut by the particular cutting edge. The chips are removed each time the broach is drawn across the periphery of a segment, by a blower or other suitable means, to prevent the clogging of the teeth. In Fig. 14, I have shown the broach 80 as being mounted with the teeth projecting downwardly, in which construction, the cuttings fall from the teeth by gravity and no additional means need be employed for effecting their removal.

Referring again to Fig. 1, it will be noted that the teeth provided on the bar 81 and those provided in the associated bars 82 are angularly disposed and are offset in relation to each other. This arrangement breaks up the continuity of the cuttings and the angular position of the teeth reduces the strain thereon and increases the life of the cutting edges.

Rearwardly of the section 85 a transverse tapered slot 89 is provided in the body portion 72 in which a wedging member 97 is mounted for retaining the various sections of the cutting bars in rigid longitudinal relation with each other. The holes, in the web 75 of the body portion, for the bolts 83, are slightly elongated to permit the longitudinal movement of the bars.

Rearwardly of the wedging member 97 a member 98 of T-shape is pivoted on a pin 99 in such manner as to be biased upwardly by springs 100. The member is provided with a sloping surface 101 which is engageable by the ends of the teeth 69 as the bar is drawn thereacross and a surface 102 is provided in the plane of the segment, adjacent to the sloping surface. After the segment has been released in the jaws by the movement of the handle 53, the return movement of the bar causes the surface 102 to engage the teeth 69 of the segment to withdraw the segment from the jaws.

In Figs. 11, 12, 13 and 14 I have shown a work piece which is similar to the work piece illustrated in Figs. 8, 9 and 10 with the exception that three helical teeth are cut in the sector 90 thereof. A broaching cutter 91, for machining the sector 90, is similar to the broaching cutter 36, having a body portion 92 which is centrally recessed longitudinally of its length in a manner similar to that described above with relation to the broaching cutter 36. A plurality of cutting bars 93, 94, 95 and 96 are provided with cutting edges which are related to each other in a manner similar to that described above, with the exception that a third recess is provided longitudinally of the cutter 91 for the purpose of machining a third tooth in the work piece 90.

The cutting bars 93 and 96 are provided with cutting edges throughout their depth for the purpose of increasing the life of the cutters since the teeth may be sharpened until the adjacent abutting sides of the bars have been entirely eliminated and the bars no longer engage each other at their base portions. Suitable securing means such as bolts 83, as provided in the broaching cutter 36, may be employed for retaining the various bars on the body portion 92 of the cutter.

It will thus be seen that I have provided a machine for cutting helical teeth in a sector by a single longitudinal movement of a cutting tool. While I have illustrated and described helical teeth specifically, it is to be understood that straight teeth similar to spur teeth or the like may be cut in a gear segment by merely changing the angular relation of the sector with the cutter. The cutter employed for machining the teeth is built up from a plurality of bars having cutting teeth along their periphery which are assembled in the body portion of the cutter by suitable means to form adjacent cutting edges of progressive shape which machines the periphery of the sector to provide teeth thereon of predetermined shape.

While I have described and illustrated but two embodiments of my invention, it will be apparent to anyone skilled in the art that many changes, omissions, additions and substitutions may be made therein without departing from the spirit and scope of my invention as set forth in the accompanying claim.

Having thus described my invention, I claim:

A machine for broaching teeth on a gear segment having a shank and including a reciprocable member, a broaching cutter engageable by said member and having a plurality of rows of teeth thereon, jaws for receiving said shank and supporting said segment in the vicinity of and at an angle to said member, and adjustable means for positioning said segment about the axis of said shank and relative to said member.

CARL J. HALBORG.